Oct. 16, 1962  E. T. LEWIS  3,058,280
GANG HITCH FOR LAWN MOWERS OR THE LIKE
Filed Feb. 6, 1961
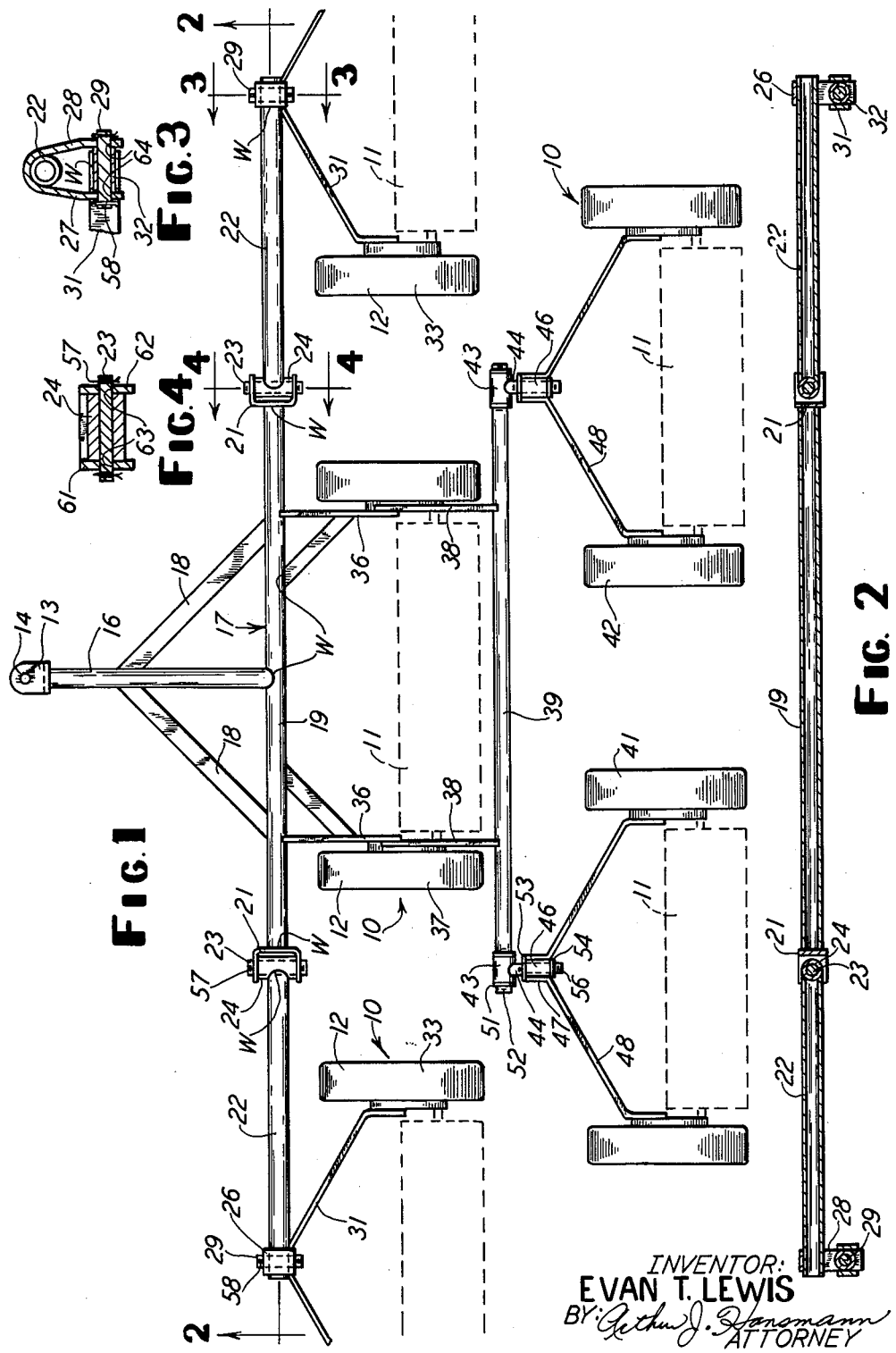
INVENTOR:
EVAN T. LEWIS
BY *Arthur J. Hansmann*
ATTORNEY United States Patent Office 3,058,280
Patented Oct. 16, 1962

3,058,280
GANG HITCH FOR LAWN MOWERS OR THE LIKE
Evan T. Lewis, Racine, Wis., assignor to Jacobsen Manufacturing Co., Racine, Wis., a corporation of Wisconsin
Filed Feb. 6, 1961, Ser. No. 87,344
4 Claims. (Cl. 56—6)

This invention relates to a gang hitch for lawn mowers or the like.

It is an object of this invention to provide a gang hitch which is simplified and an improvement with respect to the gang hitches heretofore known, and which is sturdy in its construction and reliable in its operation.

Another and important object of this invention is to provide a gang hitch which is fully articulate in the desired directions and actions of for instance, draft propelling lawn mowers over terrain. When the following description is read and considered, it is submitted that the significance of this particular object will be more fully appreciated since it is accomplished with the simplified structure referred to in the initial object.

A still further object of this invention is to provide a gang hitch for lawn mowers or the like wherein the mowers will adequately track a towing vehicle in the manner desired.

Other objects and advantages will become apparent upon reading the following description in light of the accompanying drawings wherein:

FIG. 1 is a top plan view of a preferred embodiment of the gang hitch of this invention and showing reel type lawn mowers attached thereto but with the reels shown in dotted and certain ones thereof broken away.

FIG. 2 is a sectional view taken on the line 2—2 of FIG. 1.

FIG. 3 is an enlarged sectional view taken on the line 3—3 of FIG. 1.

FIG. 4 is an enlarged sectional view taken on the line 4—4 of FIG. 1.

The same reference numerals refer to the same parts throughout the several views.

The drawings show the gang hitch of this invention as it is related to lawn mowers generally designated 10. Also, in this instance, the lawn mowers are of the reel type, but for simplification of drawing and clarity of showing the invention, the lawn mower reels 11 are depicted by the dotted line as indicated. The usual ground-engaging lawn mower wheels 12 are included in the mowers 10 and they of course transfer rotative motion to the reels 11 when the wheels 12 are towed over the ground.

Thus, the gang hitch of this invention is shown to include a connector 13 at the front end of the hitch, and it has an opening 14 for reception of a hitch pin which is not shown, but which would of course connect the gang to a pulling vehicle (not shown) such as a tractor or the like. A bar 16 is adequately connected to the connector 13 to extend rearwardly therefrom and to attach to a bar or member 17 disposed transverse to the fore-and-aft axis of the towing vehicle and of course transverse to the axis of the member 16 as shown. Braces 18 are also shown for stabilizing the connection between the members 16 and 17. The member 17 includes an intermediate bar 19 which has a fork or yoke 21 connected to the opposite ends of the member 19. The outer ends of the member 17 are comprised of extension bars or ends 22 which are hingedly or pivotally attached to the member 19 by means of the pins or shafts 23. For this hinged connection, the inner ends of the members 22 have sleeves or sockets 24 attached thereto for rotatably receiving the pins 23 which extend therethrough as shown.

The outer ends of the bars or members 22 have straps or supports 26 secured thereto and depending therebelow in legs 27 and 28, as shown in FIG. 3, for support of another hinge pin 29 extending through each of the straps 26. Thus it will be seen that draft yokes or connectors 31 of the lawn mowers on the outer ends of the front row of mowers are connected to sleeves or sockets 32 which receive the pins 29 so that the outer mowers now generally designated 33 are pivotal with respect to the draft member 17, about the axis of the respective pins 29.

To complete the general description, it will be noted that the member 17 has bars 36 extending rearwardly therefrom, and these bars attach to the center mower now designated 37 to adequately draft attach the mower 17 to the gang hitch. Also, the bars 38 are shown to extend rearwardly of the mower 37 to support a second draft bar 39 in its transverse position so that mowers 41 and 42 can also be draft connected on the gang.

At this time it will also be mentioned that the opposite ends of the member 39 receive sleeves 43 which are rotatable on the member 39, and which have a pin 44 extending rearwardly from the sleeves 43. Here again, a sleeve or socket 46 is connected to the front ends 47 of the lawn mower yokes 48 such that the sleeves 46 are rotatable on the pins 44 so that the lawn mowers 41 and 42 can pivot about the axes of their respective pins 44. Of course the lawn mowers 41 and 42 are articulated or pivotal about the axes of the member 39 because of the rotative relation that the latter has with the sleeves 43.

To further complete this description, it will be understood that conventional washers 51 flank the sleeves 43 and cotter pins or the like 52 can then pass through the member 39 to secure the washers 51 and the sleeves 43 on the member 39. Similarly, washers 53 and 54 are disposed over the pin 44 and again cotter pins 56 pass through the pins 44 to adequately secure the washers 53 and 54 and the sleeves 46 onto their respective shafts 44 in draft connecting the lawn mowers 41 and 42 to the member 39.

At this time it will also be mentioned that the members are preferably joined together by welding or the like where they are of course rigid in their juncture and such welding is indicated "W" on the lines shown by the lead line to the reference numeral mentioned. Thus, the yokes or bifurcations 21 are connected to the ends of the member 19 by means of welding as indicated and they are of course rigid with the member 19. It will therefore be understood that the members 16 and 19, along with the bifurcations 21 are established and disposed in a fixed position since they are supported by the tractor hitch and the wheels of the lawn mower 37. Also, cotter pins 57 are shown to secure the pins 23 to the forks 21, and the forks 21 with the pins 23 and the sleeves 24 are termed a hinge.

Thus the members 22 are welded as at "W" to the respective sleeves 24 to extend horizontally and laterally therefrom as shown in FIG. 2. Then the straps or supports 26 are welded as at "W" to the ends of the members 22 for being in fixed position thereon. Also, of course the inner ends of the lawn mower yokes 31, and also the trailing lawn mower yokes 48, are respectively welded to their sleeves 32 and 46. Here, also the hinge pins 29 are shown to receive cotter pins 58 for securing the pins 29 to the legs 27 and 28 of the connectors 26.

Thus, the outboard mowers 33 are displaceable or pivotal about the axis of the pins 23 as their arms 22 are free to move vertically with respect to the ground position and as related to FIG. 2, and the outboard mowers are also free to pivot about their respective pins 29 and this gives them a double action as desired in having the mowers conform to the surface of the terrain being mowed.

The important feature of the construction shown and described is that while the draft member 17 remains in an aligned position transverse to the fore-and-aft axis of the towing vehicle, the outboard mowers 33 are free to both move up and down and to pivot about their respective draft pins 29 for the complete articulated movement desired. This desirable function is accomplished by disposing the axes of the two hinges on each side of the center line of the gang parallel to the fore-and-aft axis of the towing vehicle.

At the same time, the outer hinge having the hinge pin 29, will not fall down off the horizontal plane shown in FIG. 2 because of the particular arrangement of the hinge pin 23 and 29. That is, hinge pins 23 have longitudinally spaced-apart bearing supports provided by the legs 61 and 62 on each of the forks 21. The legs 61 and 62 have restricted openings 63 therethrough so that the pins 23 are snugly received in the openings 63 and they are therefore firm with the forks 21. Also, the legs 27 and 28 of the connectors 26 have restricted openings 64 for snugly receiving their pins 29, and further the sleeves 32 and the pins 29 are snugly related so that there is no room for excessive motion with the exception of, of course, the rotation possible between the two parts mentioned. With this arrangement, the tendency of the pins 29 to fall downwardly from the positions shown in FIG. 2 is resisted by the fact that in order for the pins 29 to fall downwardly, the member 22 must rotate slightly about its axis, since the downward fall of pin 29 would be about the axes of the mower wheels 12, but of course the member 22 cannot so rotate about its axis because of the spaced-apart bearing support of the pin 23 on the legs 61 and 62 of the forks 21. The tendency to rotate member 22 about its axis creates a force couple on the bearing points at the legs 61 and 62, and the bearings resist such couple. Thus, the lawn mower yokes 31 are extended in a horizontal plane from their connection on the mowers 33 to their connection on the members 26, and any tendency for the latter to fall down would of course require that the hinge pins 29 be rotated about the hinge pins 23 so that in the plan view of FIG. 1 the pins 29 would move inwardly toward the pins 23 and this in turn would require that the mowers 33 be displaced inwardly and such mower action would of course not be possible, and accordingly the pins 29 and their attending hinge parts remain elevated as shown upon giving full articulated action as described.

While a specific embodiment of this invention has been shown and described, it will be understood that certain changes could be made therein and the invention therefore should be limited only by the scope of the appended claims.

What is claimed is:

1. A gang hitch for articulately connecting a gang of lawn mowers to a tractor, comprising a rigid first draft member attachable to said tractor to be disposed transverse to the fore-and-aft axis thereof, a lawn mower fixedly attached to said first draft member for support of the latter parallel to the ground, a second draft member disposed on each end of said first draft member and extending co-axial therewith, a first pivot pin and sleeve connection extending between said first draft member and said second draft member at the junction therebetween and being disposed parallel to said axis for up and down pivotal movement of said second draft member with respect to said first draft member, said pin and sleeve connection including two bearing points axially disposed therealong for rendering said draft members rigidly connected with respect to a force couple acting on said bearing points, a plurality of connectors attached to said draft members for connecting lawn mowers thereto and rearwardly thereof, a second pivot pin and sleeve connection disposed intermediate said second draft member and one of said lawn mowers attached thereto and being disposed parallel to said axis for pivotal movement of said lawn mower about the axis of the latter said connection and with the latter having two bearing points axially disposed therealong for rendering the latter said connection rigid against a force couple acting on said bearing points.

2. A gang hitch for articulately connecting a gang of lawn mowers or the like to a tractor, comprising a first draft member attachable to a tractor and extending therebehind in a direction transverse to the fore-and-aft axis of said tractor, a first pair of articular joints disposed on said draft member for vertically pivotally attaching the opposite ends of said draft member to the intermediate portion thereof, said joints having spaced-apart bearing points to be rigid in the horizontal direction of said axis, a second pair of articular joints disposed on said ends of said draft member and having flexibility about an axis parallel to said fore-and-aft axis and having spaced-apart bearing points, a plurality of lawn mowers connected to said draft member with two of said lawn mowers respectively connected to said second pair of joints and a third one of said lawn mowers fixedly connected to said intermediate portion of said draft member and spaced from said two of said lawn mowers and with all three of said lawn mowers forming a front gang, an additional draft member attached to said third one of said mowers and disposed rearwardly thereof parallel to said first draft member, a third pair of articular joints disposed on opposite ends of said additional draft member, and two additional lawn mowers connected to said third joints and disposed aligned with the spaces on said front gang.

3. A gang hitch for articulately connecting a gang of lawn mowers to a tractor, comprising a draft member attachable to said tractor to be disposed transverse to the fore-and-aft axis of said tractor, a first articular joint of a bifurcated yoke and pin type disposed on said draft member and having a hinge axis disposed parallel to said fore-and-aft axis for vertical pivotal movement of the end portion of said draft member and rendering said first joint rigid in the horizontal plane, a lawn mower including a yoke extending forwardly therefrom and being pivotal in the vertical direction about an axis transverse to said fore-and-aft axis, and a second articular joint of a bifurcated yoke and pin type disposed on said end portion of said draft member and being connected to said yoke and having a hinge axis disposed vertically offset from said draft member and parallel to said fore-and-aft axis for pivotal movement of said lawn mower about the latter said hinge axis, said second joint having bearing points axially spaced apart on the pin thereof for rendering the same rigid transverse to its axis.

4. A gang hitch for articulately connecting a gang of lawn mowers to a tractor, comprising an elongated draft bar, means attached to said draft bar for connecting the latter to said tractor, two articular joints of the yoke and pin type disposed on said draft bar along the length thereof and spaced inwardly from the ends thereof with the yokes being disposed in the horizontal plane and being adapted for up and down pivotal movement of the end portions of said draft bar about said joints, a first lawn mower rigidly attached to the intermediate portion of said draft bar between said two joints for supporting said draft bar, two additional articular joints of the yoke and pin type disposed on said end portions with the yokes being disposed in the vertical plane and the pins being parallel to the pins of the first said articular joints, a lawn mower attached to each of the second articular joints for pivotal movement about the pins thereof and constituting a first gang of mowers along with said first mower, and a second gang of two mowers attached to said first gang and being disposed therebehind.

References Cited in the file of this patent

UNITED STATES PATENTS

| | | |
|---|---|---|
| 1,712,722 | Worthington | May 14, 1929 |
| 2,830,421 | Blue et al. | Apr. 15, 1958 |
| 2,890,561 | Bonner et al. | June 16, 1959 |
| 2,944,615 | Clark | July 12, 1960 |

FOREIGN PATENTS

| | | |
|---|---|---|
| 984,534 | France | Feb. 28, 1951 |